US006100946A

United States Patent [19]

Buzak et al.

[11] Patent Number: 6,100,946

[45] Date of Patent: Aug. 8, 2000

[54] PALC DISPLAY PANEL WITH LC RECEIVING SPACE HAVING A VOLUME SUBSTANTIALLY GREATER THAN THE VOLUME OF LC SPACE

[75] Inventors: Thomas S. Buzak; Kevin J. Ilcisin, both of Beaverton; Paul C. Martin, Sunriver, all of Oreg.

[73] Assignee: Tektronix, Inc., Beaverton, Oreg.

[21] Appl. No.: 09/089,847

[22] Filed: Jun. 3, 1998

Related U.S. Application Data

[60] Provisional application No. 60/048,745, Jun. 5, 1997.

[51] Int. Cl.[7] ........................ G02F 1/133; G02F 1/1341; H01J 17/49; G09G 3/10

[52] U.S. Cl. ........................ 349/32; 349/189; 313/582; 345/37; 345/41

[58] Field of Search ........................ 349/32, 189, 24; 313/582, 583, 584; 345/37, 41; 365/116

[56] References Cited

U.S. PATENT DOCUMENTS

| | | | |
|---|---|---|---|
| 5,399,114 | 3/1995 | Park | 445/1 |
| 5,405,494 | 4/1995 | Nagano | 156/655 |
| 5,420,707 | 5/1995 | Miyazaki | 359/54 |
| 5,772,486 | 6/1998 | Seki | 445/24 |
| 5,800,232 | 9/1998 | Miyazaki | 445/24 |
| 5,810,634 | 9/1998 | Miyazaki et al. | 445/25 |
| 5,897,415 | 4/1999 | Roberson et al. | 445/50 |
| 5,917,583 | 6/1999 | Roberson et al. | 313/582 |
| 5,967,871 | 10/1999 | Kaake et al. | 445/24 |

*Primary Examiner*—William L. Sikes
*Assistant Examiner*—Tarifur R. Chowdhury
*Attorney, Agent, or Firm*—John D. Winkelman; John Smith-Hill

[57] ABSTRACT

A PALC panel is filled with LC material by creating a partial vacuum in the LC space and a peripheral receiving space inward of an attachment bead which secures the lower substrate assembly to the upper substrate assembly and introducing sufficient LC material into the receiving space to fill the LC space. The receiving space is then sealed. The volume of the receiving space is substantially greater than the volume of the LC space.

5 Claims, 2 Drawing Sheets

PALC DISPLAY PANEL WITH LC RECEIVING SPACE HAVING A VOLUME SUBSTANTIALLY GREATER THAN THE VOLUME OF LC SPACE

CROSS REFERENCED TO RELATED APPLICATIONS

This application claims the benefit of U.S. Provisional Application No. 60/048,745, filed Jun. 5, 1997.

BACKGROUND OF THE INVENTION

This invention relates to a method for filling a plasma addressed liquid crystal display panel with liquid crystal material.

Three types of liquid crystal (LC) display panel which have been developed are the passive LC display panel, the active LC display panel and the plasma addressed LC display panel. The passive LC display panel and the active LC display panel each comprise two transparent plates in closely spaced parallel confronting relationship and a thin layer of liquid crystal material between the confronting faces of the plates. An addressing structure resolves the layer of liquid crystal material into a rectangular array of LC elements and applies an electric field across selected LC elements to influence the polarizing characteristics of the LC elements The passive or active LC display panel is formed by securing the two transparent plates together with a bead of a suitable bonding material extending around the periphery of the plates, while leaving a gap in the bead at one corner of the panel. The confronting faces of the two transparent plates are separated by an LC space, which is currently empty of LC material. The panel is placed in a sealed chamber in a vertical orientation with the open corner of the panel directed downward. The chamber is evacuated, thereby also evacuating the space between the plates of the panel, and the open corner of the panel is dipped in a container of LC material. The partial vacuum in the chamber is then relieved, and LC material is forced into the LC space between the transparent plates. The gap in the bead is then sealed. Due to capillary action, the LC material spreads out between the plates and forms a layer of uniform thickness in the LC space.

A practical form of the plasma addressed liquid crystal (PALC) display panel is illustrated schematically in FIGS. 5 and 6 of the accompanying drawings.

The display panel shown in FIGS. 5 and 6 comprises, in sequence from below, a polarizer 2, a channel member 4, a cover sheet 6 (commonly known as a microsheet), a layer 10 of electro-optic material, an array of parallel transparent data drive electrodes (only one of which, designated 12, can be seen in the view shown in FIG. 5), an upper substrate 14 carrying the data drive electrodes, and an upper polarizer 16. The channel member 4 is typically made of glass and is formed with multiple parallel channels 20 in its upper main face. The channels 20, which are separated by ribs 22, are filled with an ionizable gas, such as helium. An anode 24 and a cathode 26 are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the lower and upper polarizers 2 and 16. In the case of a color display panel, the panel elements include color filters (not shown) between the layer 10 and the upper substrate 14. The region of the upper surface of the display panel that bounds the panel element constitutes a single pixel 30 of the display panel.

When the anode in one of the channels is connected to ground and a suitable negative voltage is applied to the cathode in that channel, the gas in the channel forms a plasma which provides a conductive path at the lower surface of the cover sheet 6. If a data drive electrode is at ground potential, there is no significant electric field in the volume element of electro-optic material in the panel element at the crossing of the channel and the data drive electrode and the panel element is considered to be off, whereas if the data drive electrode is at a substantially different potential from ground, there is a substantial electric field in that volume element of electro-optic material and the panel element is considered to be on.

It will be assumed in the following description, without intending to limit the scope of the claims, that the lower polarizer 2 is a linear polarizer and that its plane of polarization can be arbitrarily designated as being at 0° relative to a reference plane, that the upper polarizer 16 is a linear polarizer having its plane of polarization at 90°, and that the electro-optic material is a twisted nematic liquid crystal material which rotates the plane of polarization of linearly polarized light passing therethrough by an angle which is a function of the electric field in the liquid crystal material. When the panel element is off, the angle of rotation is 90°; and when the panel element is on, the angle of rotation is zero.

The panel is illuminated from the underside by an extended light source (not shown) which emits unpolarized white light. A rear glass diffuser (not shown) having a scattering surface may be positioned between the light source and the panel in order to provide uniform illumination of the panel. The light that enters a given panel element from the source is linearly polarized at 0° by the lower polarizer 2 and passes sequentially through the channel member 4, the channel 20, the cover sheet 6, and the volume element of the liquid crystal material toward the upper polarizer 16 and a viewer 32. If the panel element is off, the plane of polarization of linearly polarized light passing through the volume element of liquid crystal material is rotated through 90°, and therefore the plane of polarization of light incident on the upper polarizer element is at 90°. The light is passed by the upper polarizer element and the pixel is illuminated. If, on the other hand, the panel element is on, the plane of polarization of the linearly polarized light is not changed on passing through the volume element of liquid crystal material. The plane of polarization of light incident on the upper polarizer element is at 0° and therefore the light is blocked by the upper polarizer element and the pixel is dark. If the electric field in the volume element of liquid crystal material is intermediate the values associated with the panel element being off and on, light is passed by the upper polarizer element with an intensity which depends on the electric field, allowing a gray scale to be displayed.

In a practical implementation of the PALC display panel, the channel member 4 is etched back around the area in which the channels are formed in order to provide a plateau 34 in which the channels 20 are formed, and the cover sheet 6 is secured to the channel member by an endless frit bead 36 in a rabbet 40 extending around the periphery of the plateau. An upper substrate assembly, including the upper substrate 14 and the data drive electrodes 12 carried thereby, is attached to the channel member 4 by means of a glue bead 44 which extends almost completely around the frit bead but remains open at one corner. The confronting faces of the cover sheet 6 and the upper substrate assembly may be at a distance of about 5 μm and are separated by an LC space.

The technique described above for introducing LC material into a passive or active LC display panel cannot be used with current PALC display panels because the pressure of the ionizable gas in the channels is significant, typically about ⅕ atmosphere. If the panel were placed in a vacuum chamber with the LC space open at one corner of the panel, and the chamber were evacuated to a sufficient degree, the force due to the pressure difference between the channels and the exterior of the panel could cause the panel to explode. Accordingly, a technique has been developed by which a fill tube is attached to the panel at the corner where the glue bead is open, and vacuum is applied through the fill tube only to the LC space. Spacers between the upper substrate and the cover sheet are sufficiently close together that the force due to the pressure difference across the cover sheet and across the upper substrate is not sufficient to damage the panel. When the LC space has been evacuated, the fill tube is connected to a source of liquid crystal material and the LC material is forced into the LC space. The LC material entering the LC space spreads out through the LC space in a front from the corner at which the glue bead is open and gradually fills the LC space by capillary action. When the LC space has been filled, the fill tube is sealed, thereby effectively sealing the gap in the glue bead, and the fill tube is disconnected from the sour e of LC material.

It has been found in the case of a moderate sized panel that it can take over an hour to introduce sufficient LC material to fill the LC space and provide a uniform layer of LC material throughout the LC space with this technique. During this time, the equipment used for introducing LC material into the LC space of the panel that is being processed is not available for processing another panel.

Commercially available liquid crystal materials have high resistivity, and it is important to operation of a PALC display panel that resistivity of the LC material not be impaired. One possible mechanism for reduction in resistivity of an LC material is ionic contamination. Ionic contamination can result from contact with various materials, such as certain sodium bearing glasses. Therefore, the materials with which the LC material comes into contact, both during the filling operation and after filling is complete, must be carefully selected in order to minimize the danger of ionic contamination.

SUMMARY OF THE INVENTION

In accordance with a first aspect of the invention there is provided a method of fabricating a PALC panel comprising a lower substrate assembly including a channel plate and a cover sheet attached thereto, an upper substrate assembly and an attachment bead between the channel plate and the upper substrate assembly for securing the lower substrate assembly to the upper substrate assembly with the cover sheet and the upper substrate in spaced parallel confronting relationship across an LC space, said method comprising (a) positioning the attachment bead outward from the cover sheet at a sufficient distance to form a receiving space inward of the attachment bead, said receiving space having a volume substantially greater than the volume of the LC space, (b) creating a partial vacuum in the receiving space and the LC space, (c) introducing a quantity of LC material into the receiving space, said quantity of LC material being sufficient to substantially fill the LC space, and (d) sealing the receiving space.

In accordance with a second aspect of the invention there is provided a PALC panel comprising a channel plate, a cover sheet attached to the channel plate, an upper substrate assembly, and an attachment bead between the channel plate and the upper substrate assembly and outward of the cover sheet for securing the channel plate to the upper substrate assembly with the cover sheet and the upper substrate assembly in spaced parallel confronting relationship across an LC space, wherein the attachment bead is positioned at a sufficient distance outward from the cover sheet to form a receiving space inward of the attachment bead, said receiving space having a volume substantially greater than the volume of the LC space.

In accordance with a third aspect of the invention there is provided a PALC panel comprising a channel plate, a cover sheet attached to the channel plate, an upper substrate assembly secured to the channel plate with the cover sheet and the upper substrate assembly in spaced parallel confronting relationship across an LC space, and a pure aluminum fill tube attached to at least one of the substrate assemblies for supplying LC material to the LC space.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals are used to denote corresponding elements.

Words of orientation and position, such as upper and lower, are used in this specification to establish orientation relative to the drawings and are not intended to be limiting in an absolute sense.

DETAILED DESCRIPTION

Figure 1:
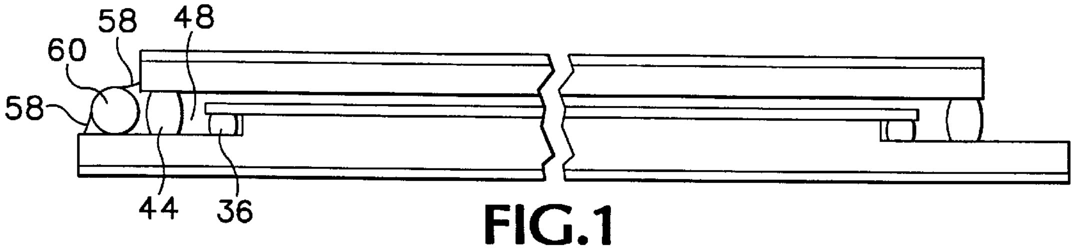
FIG. 1 is a sectional view of a PALC display panel in accordance with the present invention.
Figure 3:
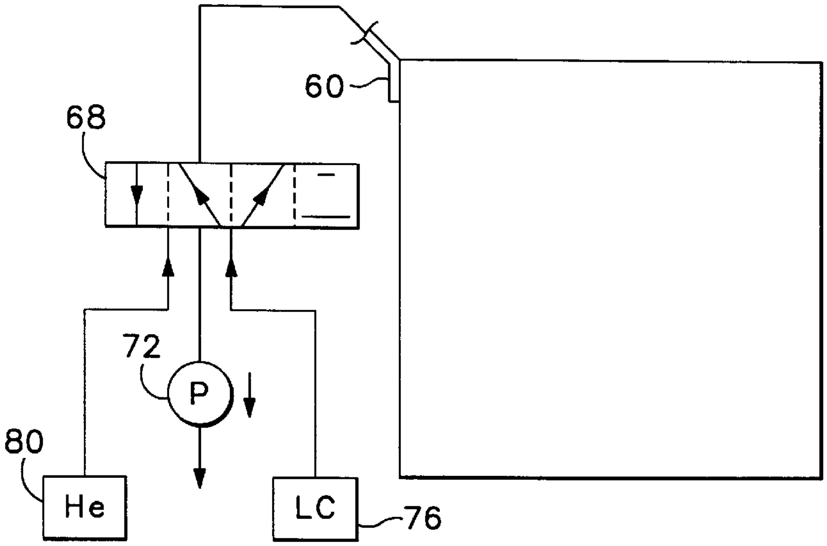
FIG. 3 is a schematic view illustrating connection of the PALC display panel shown in FIG. 1 to a fill station for introducing LC material into the LC space of the panel.
Figure 2:
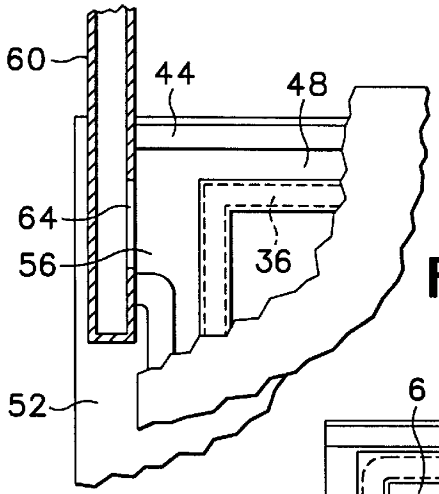
FIG. 2 is a partial plan view of the PALC display panel shown in FIG. 1, partly broken away and partly in section.

In the display panel shown in FIGS. 1 and 2, the glue bead 44 is spaced outwardly from the sealing bead 36 around the entire periphery of the plateau 34. In this manner, an LC chamber composed of the LC space between the cover sheet 6 and the upper substrate assembly and a peripheral receiving space 48, which typically has a volume at least about five times that of the LC space, is formed inward of the glue bead 48. The preferred material for the glue bead is a 2-part epoxy adhesive manufactured by 3M Corporation and sold under the designation 1838 Structural Adhesive. This adhesive has good gap filling properties for forming the bead and is inert to the LC materials that are commonly used, such as biphenyls and super fluorinated liquid crystal materials, and does not release ionic contamination into an LC material. A ledge 52 of the channel member 4 extends outwardly beyond the upper substrate assembly, and the glue bead leaves an opening 56 at one end of this ledge. A fill tube 60 of a material that does not release ionic contamination into an LC material is positioned on the ledge and is sealed to the channel member 4 and the upper substrate 14 by fillets 58 of an adhesive that does not release ionic contamination into an LC material, such as the 2-part epoxy adhesive mentioned above. The fill tube 60 has an opening 64 in its side wall in order to provide communication between the interior of the fill tube and the LC chamber.

In order to fill the LC space, the panel is placed at a fill station at which the fill tube 60 is connected to a four-way valve 68. Three of the positions of the valve 68 allow the fill tube to be connected selectively to three ports respectively. A first of the three ports is connected to a vacuum pump 72, a second port is connected to a reservoir 76 of LC material at ambient pressure, and the third port is connected to a source 80 of helium. In the fourth position, the valve 68 is closed. Filling of the LC space takes place as follows.

First, the valve 68 is set to the first position and the vacuum pump 72 is operated for evacuating the LC chamber to a low pressure. When a suitable degree of vacuum, e.g. about $1\times10^{-3}$ torr, has been attained in the LC chamber, the valve 68 is switched to its second position and LC material is allowed to flow into the LC chamber from the source 76. The LC material passes easily into the LC chamber until the peripheral receiving space 48 is filled, at which point the valve 68 may be closed by switching to its fourth position. Preferably, however, the valve is switched to its third position and a bubble of helium at about 120 mbar is introduced into the LC chamber from the source 80 and the valve is then closed. After the valve 68 is closed, the fill tube 60 is sealed. For example, in the event that the fill tube is made of glass, it may be sealed by fusing the glass. The fill tube can then be disconnected from the valve 68 and the panel can be removed from the fill station.

When the LC material has been introduced into the receiving space 48, it preferentially flows into the narrow LC space between the cover sheet and the upper substrate due to capillary action. Because the receiving space extends around all four sides of the plateau 34, the LC material is able to enter the LC space along a much longer front than in the case of the technique previously used to fill the LC space of a PALC panel. Consequently, for a given size of panel the time taken for the LC material to fill the LC space is substantially shorter than in the case of the previous technique. Furthermore, sufficient LC material to fill the LC space is forced into the receiving space 48 almost instantly, when the valve 68 is set to the second position, and therefore it is not necessary to wait until the LC space is full before disconnecting the fill tube from the valve and removing the panel from the fill station. Consequently, the fill station can be used to fill another panel even before the LC space of the previous panel is full.

When the LC material has spread from the receiving space into the LC space, surface tension effects hold the LC material in the LC space regardless of orientation of the panel. Thus, if the panel is disposed vertically, the LC material will not drain from the LC space into the receiving space.

The temperature of a PALC display panel may vary substantially. When the panel is not in use, it may be at or close to ambient temperature, which may be as low as about 15° C., whereas when the panel is in use, its temperature may be as high as 45–50° C. The volume of the LC material can vary substantially due to expansion and contraction under change in temperature. The helium bubble serves as a thermal expansion buffer and limits the pressure increase which can take place in the LC chamber due to thermal expansion of the LC material such that there is no danger of damage to the panel or of the seal in the fill tube bursting.

It is preferred that the fill tube be made of pure aluminum, such as the material sold under the designation 1000 Series, and not an aluminum alloy. Pure aluminum has the advantage that it can easily be cleaned using standard cleaning procedures to remove typical sources of ionic contamination of the LC material, such as sodium ions. Moreover, pure aluminum can be swaged, i.e. welded by pressure, and accordingly if the fill tube is made of pure aluminum, it can be sealed without application of heat by crimping.

Figure 4:
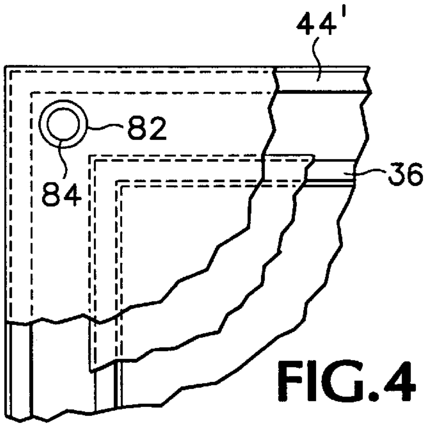
FIG. 4 is a partial plan view, partly broken away, of a modified form of PALC display panel in accordance with the invention.
Figure 6:
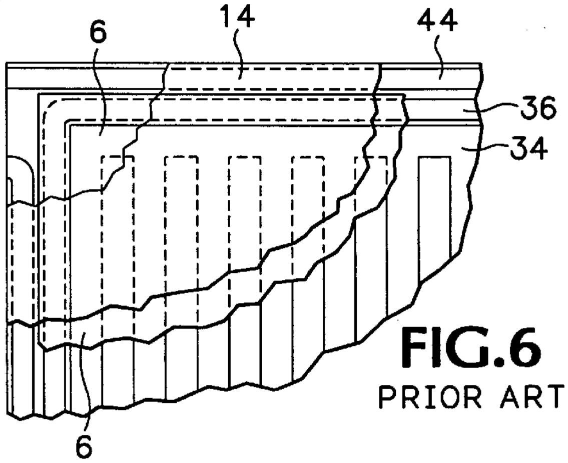
FIG.6 PRIOR ART
FIG. 6 is a partial plan view, partly broken away, of the PALC display panel shown in FIG. 5.
Figure 5:
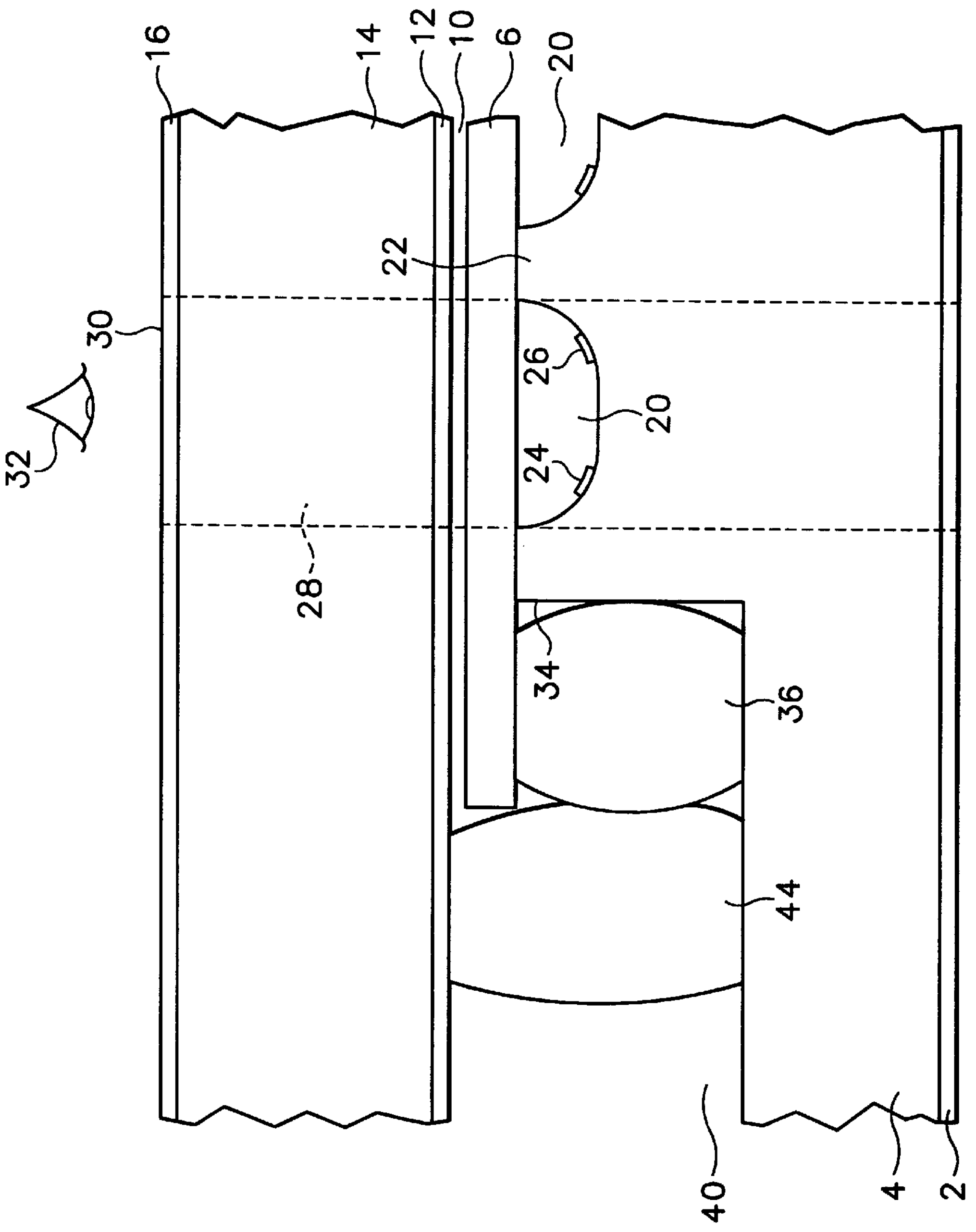
FIG.5 PRIOR ART
FIG. 5 is an enlarged partial sectional view of a PALC display panel in accordance with the prior art.

Referring to FIG. 4, instead of attaching a fill tube to the channel member 4 and the upper substrate 14 for evacuating the LC chamber and introducing the LC material via a gap in the glue bead, it may be preferable in some circumstances to gain access to the LC chamber through a hole 82 drilled in the upper substrate assembly outside the viewing area of the panel. A fill tube 84 is fitted in the hole and is sealed therein, and the tube itself is sealed after the LC material and the optional helium bubble have been introduced, as described above. In this case, the glue bead 44' may be endless and the hole 82 positioned so that it debouches between the glue bead 44' and the frit bead 36. It will be appreciated that the invention is not restricted to the particular embodiment that has been described, and that variations may be made therein without departing from the scope of the invention as defined in the appended claims and equivalents thereof.

What is claimed is:

1. A plasma addressed liquid crystal (PALC) display panel comprising:

a channel plate having an upper surface, a cover sheet secured to the channel plate overlying the upper surface thereof, an upper substrate assembly disposed overlying the cover sheet, and a bead of adhesive spacer material connecting the channel plate and the upper substrate assembly, said bead of spacer material extending along the outer margin of the upper substrate assembly, outward of the periphery of the cover sheet, and securing the channel plate to the upper substrate assembly, the cover sheet and the upper substrate assembly thereby being secured in spaced parallel confronting relationship to define an LC space between them, the bead of spacer material being disposed outward of the periphery of the cover sheet a distance sufficient to form an LC receiving space inward of said bead, said LC receiving space having a volume substantially greater than the volume of the LC space.

2. A PALC panel according to claim 1, wherein the volume of the LC receiving space is at least about five times the volume of the LC space.

3. A PALC panel according to claim 1, wherein the LC receiving space extends around substantially the entire periphery of the cover sheet.

4. A PALC panel according to claim 1, wherein the cover sheet has a peripheral margin extending around the cover sheet inward of the periphery thereof and the cover sheet is attached to the channel plate by a sealing bead of adhesive spacer material between the channel plate and the peripheral margin of the cover sheet.

5. A PALC panel according to claim 4, wherein the channel plate includes a plateau in which channels containing an ionizable gas are formed, the plateau being surrounded by a rabbet, and wherein the sealing bead is disposed in the rabbet and the LC receiving space extends around the periphery of the plateau and the attachment bead is disposed in the rabbet and extends along the sealing bead in spaced relationship therewith.

* * * * *

UNITED STATES PATENT AND TRADEMARK OFFICE

CERTIFICATE OF CORRECTION

PATENT NO. : 6,100,946
DATED : August 8, 2000
INVENTOR(S) : Thomas S. Buzak, Kevin J. Ilcisin, Paul C. Martin It is certified that error appears in the above-identified patent and that said Letters Patent is hereby corrected as shown below:

Column 6, claim 1,
Line 29, "generally" should be inserted before "along."

Signed and Sealed this

Twenty-fifth Day of September, 2001

*Attest:*

Nicholas P. Godici

NICHOLAS P. GODICI

*Attesting Officer*

*Acting Director of the United States Patent and Trademark Office*